Figure 1:
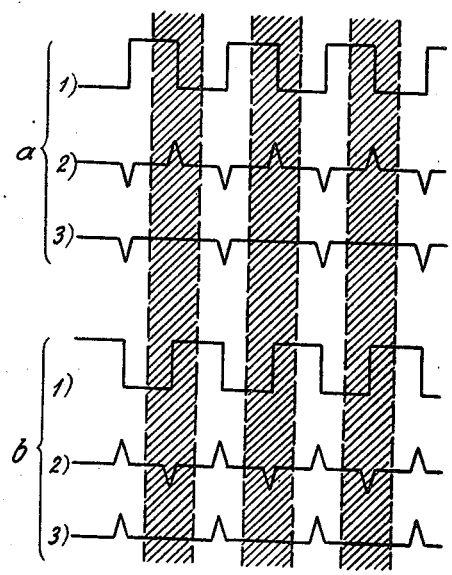

Patented Sept. 3, 1940

2,213,842

UNITED STATES PATENT OFFICE 2,213,842

DIRECTION FINDING SYSTEM

Helmut Johannson and Karl Heinz Hofmann, Berlin, Germany, assignors to C. Lorenz Aktiengesellschaft, Berlin-Tempelhof, Lorenzweg, Germany, a company Application August 25, 1938, Serial No. 226,612
In Germany June 26, 1937

3 Claims. (Cl. 250—11)

It is well known to determine the position of aeroplanes or other vehicles by the comparison of the field intensity of two signals transmitted from a transmitting station alternately in different directions. This is done, for example, by directional antenna arrangements alternately so keyed that the keying signals of the one fall in the keying pauses of the other antenna arrangement. By the amplitude comparison of the two received signals a guiding line is defined which is used for navigation. For visual indication of this guiding line an arrangement has geen suggested in which on the receiving side the two high frequency signals are amplified, rectified and conveyed over a transformer to an indicating instrument. Over this transformer only the cutting-in and cutting-out processes of the key signals as potential peaks are transmitted, which are directed in accordance with the direction of current variation on the primary circuit of the transformer. The indicating instrument is so constructed that it is highly sensitive in the vicinity of the normal position, and as far as possible insensitive in the range of the maximum deflection. Thereby, it is obtained that from time to time only the first front of the keying signal is effective, while the termination of the signal does not substantially influence the instrument, thus the pointer of the instrument reacts on the inserting process of the signals of the one kind, and on the cutting-out processes of the signals of the other kind. According to whether the one or other type of signal predominates there is an indication to the right or to the left which indicates the displacement from the course line.

It has further been suggested to employ the same method of indication in directed receiving arrangements for position finding relative to non-directional operating transmitting stations. For this purpose on the receiving side alternately two differently directed antennae arrangements are connected in accordance with a certain rhythm with the receiving apparatus, or in another way two differential characteristics are keyed, for example, by phase reversal of a frame antenna, or of a non-directional auxiliary antenna. The last mentioned direction-finding arrangements are generally known by the designation of homing receivers.

The drawback of the methods of indication described fundamentally consists in the fact that their optimal efficiency is dependent upon the length of the keying signal, and upon the period which the instrument requires to reach the maximum deflection since the reversed impulse, after the end of the signal, must not come earlier than the instrument has arrived in a position of low sensitivity. This time may be appreciable because of the inertia and attenuation of the indicator. This requirement has the result that the keying frequency must not be chosen substantially much higher than one signal per second. It has, however, been attempted particularly with homing receivers to increase the number of signals per second considerably, for example, to ten, or even more keying signals. By the present invention a method of indication is suggested which, even with higher keying frequencies, gives an exact right-left indication. This is obtained in accordance with the invention by the fact that only one signal peak, corresponding to the initial keying peak of the keying signal is conveyed to the indicating instrument, while the second signal peak, corresponding to the keying signal termination is eliminated. This is obtained by the fact, for example, that the indicating instrument is short-circuited for the period of the signal peak to be suppressed, or the circuit of the indicating instrument is interrupted.

The conditions are explained in more detail by means of the attached drawing. Fig. 1 shows the potential processes effective on the receiver output, or on the indicating instrument respectively, in curve form, Fig. 2 an embodiment of the new method of indication by way of example.

In Fig. 1 $a$ represents the signal of the one kind, and $b$ the signal of the other kind, which is effective at times in the keying pauses of $a$. The curves 1 represent the keying signals effective on the receiver output after rectification and amplification, and which are conveyed to a transformer. The latter transmits the cutting-in and cutting-out processes of the signal peaks as potential peaks in accordance with the curves 2 which are oppositely directed for the signal $a$ to what they are for the signals $b$. One of the two potential peaks is now made ineffective in accordance with the invention, as otherwise the instrument would persist in its normal position. With the known arrangement this was done by a variable selectivity curve of the indicating instrument. In accordance with the present invention this is obtained by suppressing the one signal peak and thus the appurtenant potential peak, and thus for a range which approximately corresponds to that indicated by hatching. Consequently, only the two opposite potential peaks of the curves 3 are conveyed to the indicating instrument. According to whether one or other potential peak is predominating the instrument will swing to the right or to the left. With equality of amplitude of the two keying signals and thus of the two potential peaks the indicating instrument remains in the normal position whereby the adherence to the course line is characterized. The number of signals per second has no influence on the new method of indicating so that much more rapid keying can be employed. The length ratio of the two types of signals is also of no importance.

Figure 2:
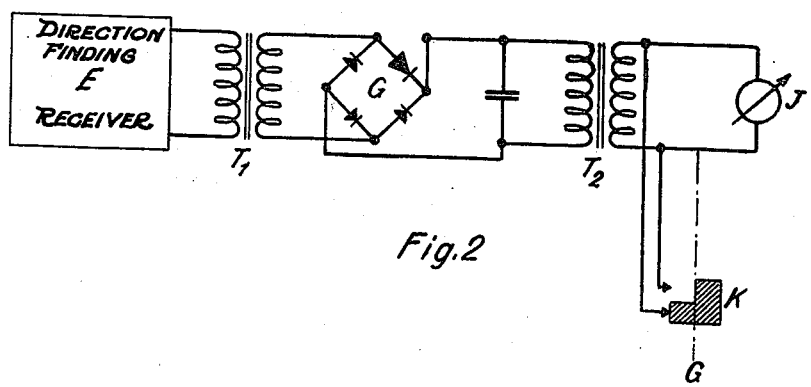

With the arrangement of Fig. 2 the effective keying signals on the output of the direction-finding receiver E are conveyed over the transformer $T_1$ to the rectifier G and the rectified signals obtained on the rectifier output are transmitted to the transformer $T_2$ which only transmits the signal fronts as potential peaks, which are picked up on the secondary side and conveyed to the indicating instrument J. In order to suppress the one signal peak the short-circuit contact K is provided which is closed during the suppressing signal front. This may be obtained, for example, by rotating the short-circuit contact and alternately closing switch springs by cams respectively. The frequency of the rotation and the period of opening and closing of the switch springs respectively are adjusted in accordance with the frequency of the keying signals received. With homing receivers with non-directional antenna arrangements keyed over on the receiving side with the aid of mechanical devices, this can be done in a simple manner by coupling together the switching means for the antenna change-over and the switching means for suppressing the one signal front. The arrangement can also be so conceived that short-circuit operation is not employed but from time to time during the period of the signal front to be eliminated the circuit of the indicating instrument J is opened.

What is claimed is:

1. Means for producing indications by comparison, of received signal impulses forming interlocking signals comprising a receiver for said signal impulses, means for rectifying said received signals to produce direct current pulsations, an indicating meter, a transformer for impressing said direct current pulsations on said meter whereby said impulses comprise oppositely directed potential peaks indicating the beginning and termination of each direct current pulsation, and means for suppressing alternate ones of said potential peaks.

2. An arrangement according to claim 1 wherein said suppressing means comprises an arrangement for periodically short-circuiting said meter.

3. An arrangement according to claim 1, wherein said suppressing means comprises an arrangement for open circuiting said meter circuit.

HELMUT JOHANNSON.
KARL HEINZ HOFMANN.